UNITED STATES PATENT OFFICE.

ADOLPH FRANK, OF CHARLOTTENBURG, PRUSSIA, GERMANY.

PRODUCTION OF SULPHITE SOLUTIONS.

SPECIFICATION forming part of Letters Patent No. 376,190, dated January 10, 1888.

Application filed July 21, 1887. Serial No. 244,914. (No specimens.) Patented in England October 18, 1886, No. 13,286; in Canada December 24, 1886, No. 25,613, and in Austria-Hungary April 1, 1887, No. 40,472 and No. 5,831.

*To all whom it may concern:*

Be it known that I, ADOLPH FRANK, doctor of philosophy, a subject of the Emperor of Germany, residing at Charlottenburg, Prussia, German Empire, have invented certain new and useful Improvements in the Production of Sulphite Solutions; and I do hereby declare the following to be a full, clear, and exact description of the invention, such as will enable others skilled in the art to which it appertains to make and use the same.

This invention consists in a process for producing acid-sulphite solutions, and obtaining at the same time calcium sulphate, (annaline, pearl-hardening, or pearl-white,) for which I have received foreign patents as follows: Canada December 24, 1886, No. 25,613; Great Britain October 18, 1886, No. 13,286; Austria-Hungary April 1, 1887, No. 40,472 and No. 5,831.

In the preparation of these acid-sulphite solutions I employ calcium monosulphite, which may be obtained by any desired or known process, (preferably by the process described in my application for patent filed on or about the 18th of October, 1886, Serial No. 216,560,) and treat the same with free sulphuric acid, or with sulphuric acid combined with sulphate of soda—that is to say, acid sulphate of soda.

In carrying out my invention I mix the calcium monosulphite with water and sulphuric acid, the latter in such proportion as will be necessary to bind one-half of the lime in the solution with a view to its conversion into calcium sulphate. The other half of the lime remains in combination with the sulphurous acid of the calcium monosulphite, and forms a calcium sulphite soluble in water, while the calcium sulphate precipitates and the acid calcium sulphite goes into solution.

By the use of sulphuric acid, whether free or combined, I am enabled to obtain a valuable by-product—namely, the annaline used in the manufacture of paper. On the other hand, I have discovered that calcium sulphate is less soluble in an acid-sulphite solution than it is in water. The separation, therefore, of the sulphate is more complete than by any other process.

The reactions in the process—when, for instance, the acid solution is to contain bisulphite—are illustrated by the following formula, according to which the amount of sulphuric acid required relatively to the amount of calcium monosulphite employed may be readily calculated:

$$2(CaSO_3) + H_2SO_4 = (CaSO_3, H_2SO_3) + CaSO_4$$

Calcium sulphite.    Sulphuric acid.    Calcium bisulphite.    Calcium sulphate.

The annaline precipitate may be separated from the solution in any desired manner, and is then washed in water.

If it is desired to employ sulphuric acid in combination, instead of free sulphuric acid, in the production of an acid-sulphite solution that is to contain bisulphite, as in the above example, sodium bisulphate may, for instance, be employed.

The process is substantially the same as above described, with this exception, that instead of using free sulphuric acid a solution of sodium bisulphate is used in which the proportion of partly-combined sulphuric acid is equal to the amount of free sulphuric acid in the first example given, as will be readily understood. In this case sodium bisulphite is produced instead of calcium bisulphite, and, owing to the presence of sodium sulphate, the whole of the lime of the calcium monosulphite is converted into annaline.

The following formula shows the reactions of this mode of procedure, and also affords the means for calculating the amount of sodium bisulphite to be employed:

$$2(CaSO_3) + (Na_2SO_4, H_2SO_4) = 2(CaSO_4) + (Na_2SO_3, H_2SO_3)$$

Calcium sulphite.    Sodium bisulphite.    Annaline.    Sodium bisulphite.

The resulting annalin is, as above described, separated from the solution and washed. In either case an acid-sulphite solution is obtained from the calcium monosulphite, which may, for example, be employed in the sulphite-solution process.

In case the acid-sulphite solutions are not to contain bisulphite only, a less quantity of sulphuric acid is employed for the less acid solutions and a greater quantity for the more acid solutions to be obtained.

Having described my invention, what I claim is—

The described process of producing acid-sulphite solutions from calcium monosulphite and obtaining calcium sulphate, which consists in treating the calcium monosulphite with sulphuric acid or with acid sulphate of soda, as set forth.

In testimony whereof I affix my signature in presence of two witnesses.

ADOLPH FRANK.

Witnesses:
B. ROI,
CARL BEZA.